Oct. 9, 1951  O. F. GULLICK  2,570,798

REGULATION OF HIGH-FREQUENCY OSCILLATORS

Filed May 17, 1949

Inventor:
Oliver F. Gullick,
by Merton D. Morse
His Attorney.

Patented Oct. 9, 1951

2,570,798

UNITED STATES PATENT OFFICE 2,570,798

REGULATION OF HIGH-FREQUENCY OSCILLATORS

Oliver F. Gullick, Rugby, England, assignor to General Electric Company, a corporation of New York Application May 17, 1949, Serial No. 93,767
In Great Britain May 19, 1948

4 Claims. (Cl. 250—36)

This invention relates generally to electronic high frequency oscillators and more particularly to a regulatory system for limiting the circulating current in the tuned output circuit of such an oscillator. The invention finds particular application to oscillators employed for high frequency heating, in which very large variations in the tuning of the output circuit occur, depending upon the presence or absence of a heating load in the circuit.

In the application of electronic oscillators to high frequency heating, the problem arises of limiting the circulating current in the capacitors comprised in the resonant output circuit in which the energy for high frequency induction heating is generated. This current varies within wide limits according as to whether or not a heating load is in operative association with the output circuit. When the load is removed, current in the output circuit increases materially and is liable to exceed the reactive volt-ampere and current rating of the capacitor. It follows naturally that if capacitors are utilized which are capable of supporting the maximum current which occurs when the load is removed, such capacitors must necessarily have a higher rating and be more expensive than those which would be adequate to support the maximum current when the load is associated with the output circuit.

Accordingly, it is an object of the present invention to provide a regulatory system for limiting the current in the output circuit of such an oscillator.

Another object of this invention is to provide a current limiting system operating in association with a high frequency induction heating oscillator, which will insure that the current circulating in the output circuit of this oscillator does not exceed a predetermined value, whether or not a load is associated with the output circuit.

A further object of this invention is to provide a new and improved system for producing a unidirectional control voltage proportional to the magnitude of the current circulating in a circuit.

For further objects and advantages and for a better understanding of the invention, attention is now directed to the following description and accompanying drawings, and also to the appended claims in which the features of the invention believed to be novel are more particularly pointed out.

In accordance with my invention, a coupling loop and a rectifier are associated with the output or tank circuit of an oscillation generator to provide a unidirectional voltage bearing a relation to the current in the tank circuit. This unidirectional voltage is utilized to control the conductivity of rectifying tubes which supply operating potential to the generator. Accordingly, when the load is removed from the output circuit, the current developed in it is maintained within a given maximum value by automatically controlling the anode voltage supplied to the oscillation generator. By this means, an increase in the output current beyond a predetermined value, effects a reduction in the conductivity of the rectifying tubes, thereby limiting the volt-amperes and the current developed in the output circuit to a safe value.

Figure 1:
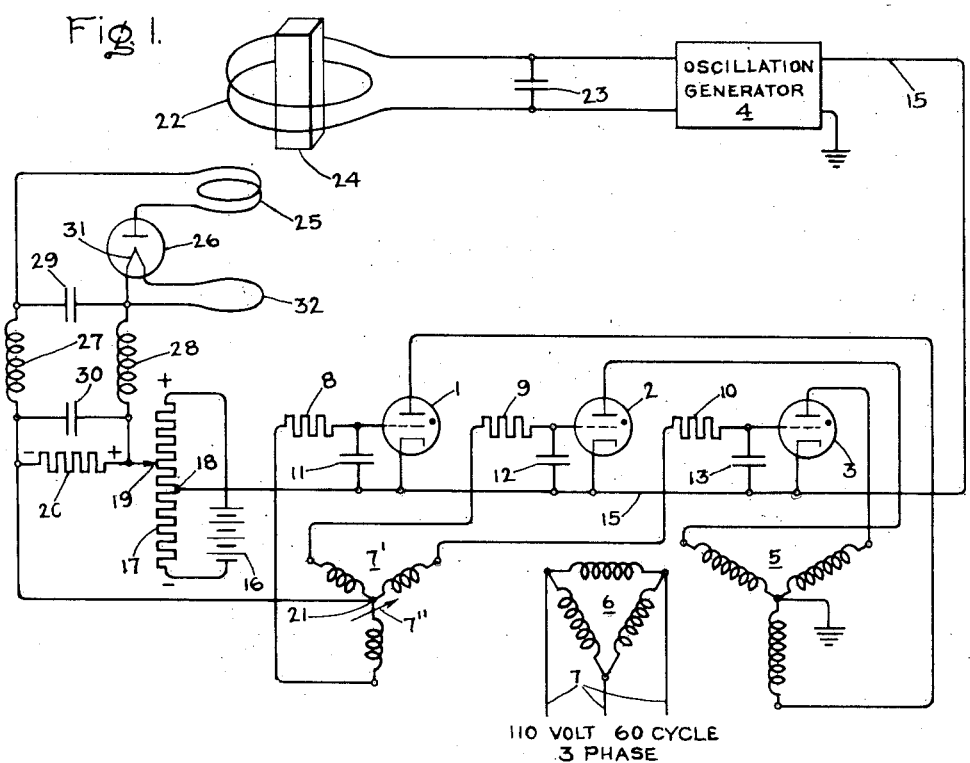
Fig. 1 is a schematic diagram partly in block form, illustrating an embodiment of my invention comprised in an induction heating oscillation generator.

Referring to Fig. 1, there are shown three electron tubes 1, 2, and 3, which are provided for the purpose of rectifying voltages from an alternating current three phase source, to produce a unidirectional operating voltage for an oscillation generator 4. These electron tubes are of the electrostatically controlled arc rectifying type, commonly known as thyratrons. In accordance with well known principles, the average conductivity of such tubes may be controlled by varying the instant at which the tube becomes conducting in the half cycle during which its anode is positive with respect to its cathode. The control of this instant may be effected by varying the phase of the alternating voltage applied to the control electrode of the tube with respect to that applied to the anode. Control of this instant may also be effected while maintaining the relative phases of the control electrode and anode voltages constant, by superimposing an auxiliary unidirectional bias voltage on the alternating voltage which is supplied to the control electrodes.

Alternating voltage at a high potential is applied to the anodes of tubes 1, 2, and 3 from the terminals of a Y-connected three phase transformer secondary 5 whose common point is grounded. Secondary 5 operates in conjunction with a delta-connected primary winding 6 which is supplied with 110 volt 60 cycle three phase alternating voltage through leads 7. Associated with the primary winding 6, is a Y-connected tertiary winding 7', whose branches are connected through resistors 8, 9, and 10 to the control electrodes of devices 1, 2, and 3 respectively. The required phase connections in the tertiary winding 7' are observed to insure that the phase of the voltage supplied to each control electrode corresponds to that of the voltage supplied by the windings of the secondary 5 to the anodes. Tertiary winding 7' is adjustable, as indicated by the arrow 7'', to vary the phase relationship of the voltages at its output terminals with respect to that at the output terminals of secondary winding 5. Capacitors 11, 12, and 13 are connected between the control electrodes and cathode of tubes 1, 2, and 3 respectively, and operate, in conjunction with resistors 8, 9, and 10, to limit any transient voltages occurring at the control electrodes. The cathodes are all connected to a common conductor 15.

In accordance with well known principles, each one of the tubes 1, 2, and 3 normally conducts during one-third of the alternating current supply cycle. In other words, devices 1, 2, and 3 each conduct successively for 120 electrical degrees. This mode of conduction requires the assumption that each tube strikes, that is that current flow in each tube begins at the instant when the voltage at the anode exceeds the voltage at the cathode. However, the instant at which each tube strikes may be delayed, both by varying the phase of the alternating voltage supplied to the control electrodes from tertiary winding 7', and also by supplying a unidirectional bias voltage to the control electrodes. The bias voltage is supplied from an adjustable source constituted by a battery 16 and a potentiometer 17. The common conductor 15 joining the cathodes is connected to a midpoint 18 in potentiometer 17, and a variable tap 19 is connected through a series resistor 20 to the common point 21 of tertiary winding 7'.

It will now be apparent that the instant of conductivity in the rectifier tubes may be controlled both by varying the phase setting of tertiary winding 7', and by varying the adjustment of potentiometer 18. Either adjustment may be employed to control the magnitude of the rectified voltage on conductor 15. This rectified voltage is supplied by means of conductor 15 to the oscillator generator 4, which may be any common type of electronic oscillator wherein the amplitude of the high frequency output current is dependent upon the magnitude of the operating potential supplied to it. The high frequency currents from oscillation generator 4 occur in an output or tank circuit comprising an inductive winding 22 and a capacitor 23. The magnetic field created by currents circulating in winding 22 are utilized for the purpose of heating various objects serving as loads, such as, for instance, a rectangular metal block 24. This particular embodiment of my invention is concerned with limiting the current circulating through capacitor 23 to a safe value, irrespectively of whether or not heating load 24 is associated with the circuit.

In accordance with my invention, the above-mentioned object is effected by means of an arrangement in which coil 25 represents a high frequency coupling loop which is inductively located with respect to the output circuit inductance 22. Coupling loop 25 is connected to a diode rectifier 26 and a filtering circuit comprising inductances 27 and 28 and capacitors 29 and 30. The particular connections shown permit the high frequency currents circulating in loop 25 to develop, across resistor 20, unidirectional voltage of the polarity indicated. The magnitude of the voltage developed across resistor 20 varies in accordance with the amplitude or intensity of the currents circulating in the output circuit, and serves as a control voltage which is effectively in series with the other manually adjustable voltages supplied to the control electrodes of the rectifier tubes. It will be apparent that an increase in the circulating current in the output circuit, such as would occur when heating load 24 is removed, causes an increase in the control voltage developed across resistor 20. This in turn supplies a certain value of negative bias at the control electrodes of the rectifier tubes, thereby delaying the instant of firing during the conduction cycle. This, in turn, causes a decrease in the positive voltage on conductor 15, which achieves the desired object of reducing the amplitude of the oscillations in generator 4 and limiting the current in capacitor 23.

The filament or electron emitter 31 of diode 26 is shown connected to an auxiliary loop 32 which is also inductively coupled to the output circuit. This is an additional feature of my invention, however it is not essential to the operation of the circuit in this embodiment. Filament 31 could be heated in normal fashion by means of 60 cycle current or by means of direct current. However, this particular arrangement has the advantage that the temperature of the filament and its emissive power increase in proportion to the current circulating in the output circuit, which current it is desired to regulate. Accordingly, when the current in the output circuit of the oscillation generator increases, not only does the voltage applied by coupling loop 25 to the anode of diode 26 increase, but also the voltage applied by coupling loop 31 to filament 30 increases the conductivity of diode 26. This feature increases the efficiency of the regulating action, and provides a larger variation in the control voltage across resistor 20 than would otherwise be possible, thereby improving the regulatory effect of the system.

Figure 2:
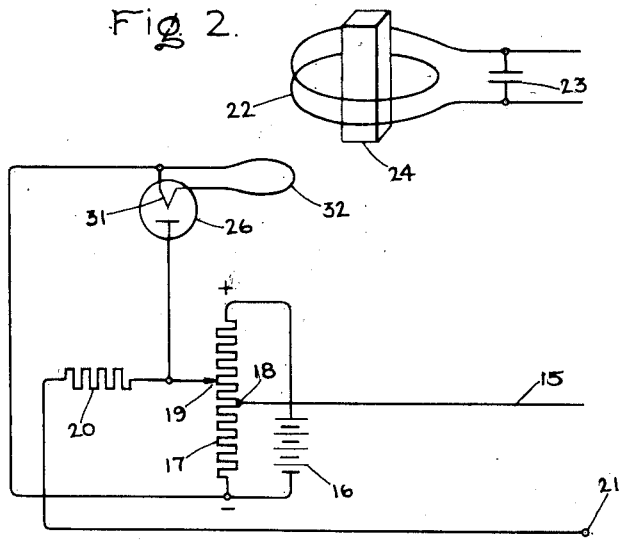
Fig. 2 is a schematic diagram illustrating a variation in the regulation system of Fig. 1.

In the modified arrangement shown in Fig. 2, similar numerals as in Fig. 1 have been used to indicate corresponding parts. In this arrangement the coupling loop 25 has been eliminated and diode 26 operates simply as a variable conductance between tap 19 and the negative terminal of potentiometer 17. The value of the shunt conductance offered by diode 26 is the function of the emissivity of filament 31, which in turn is controlled by the voltage coupled thereto by loop 32. When the currents in the output circuits increase in amplitude, the conductance of diode 26 increases, and the bias on the control electrodes of rectifier tubes 1, 2 and 3 becomes more negative, thereby decreasing the operating voltage to oscillator 4.

The modified arrangement illustrated in Fig. 2 has certain advantages for very high frequency applications. It permits a small coupling loop having a decreased inductance. This is advantageous for use in dielectric heating oscillators, wherein the electric field developed between a pair of capacitor plates is utilized for heating the load. In such a generator, the magnetic field is reduced and accordingly a small coupling loop is preferable. This arrangement also permits a shorter high frequency circuit in association with the coupling loop, which is desirable at the higher frequencies used for dielectric heating.

While certain specific embodiments have been shown and described, it will, of course be understood that various modifications may be made without departing from the invention. The appended claims are, therefore, intended to cover any such modifications within the true spirit and scope of the invention.

What I claim as new and desire to secure by Letters Patent of the United States is:

1. A regulatory system for limiting the oscillatory currents in the tuned output circuit of an oscillator, comprising a coupling loop located in the magnetic field produced by said oscillatory currents and in operative association with said output circuit, a diode rectifier having an anode and a filament whose electron emissivity varies in accordance with the current therethrough, said filament being connected to said loop for controlling said emissivity in accordance with said oscillatory currents, whereby said diode operates as an equivalent conductance whose magnitude varies as the amplitude of said oscillatory currents, a source of operating voltage for said oscillator and means in said source for reducing said voltage in accordance with the magnitude of said equivalent conductance.

2. A regulatory system for limiting the oscillatory currents in the tuned output circuit of an oscillator, comprising a pair of coupling loops located in the magnetic field produced by said oscillatory currents, a diode rectifier having an anode and a filament whose electron emissivity varies in accordance with the current therethrough, one of said loops being connected to said filament, and the other of said loops being connected, in series with the anode-filament circuit of said rectifier, to a network for developing therein a unidirectional voltage whose magnitude varies with the amplitude of said currents, both said loops cooperating to increase the effective variation in the magnitude of said unidirectional voltage with respect to variations in the amplitude of said currents, a source of operating voltage for said oscillator, and means in said source for reducing said voltage in accordance with the magnitude of said unidirectional voltage developed in said network.

3. A regulatory system for limiting the maximum amplitude of high frequency currents in the tuned output circuit of an oscillation generator utilized as an induction heater, the amplitude of said currents being subject to regulation by the magnitude of the operating voltage supplied to said generator, said output circuit being normally subject to large variations in the amplitude of said currents depending upon whether or not a heating load is in operative association therewith, comprising a coupling loop located in proximity to said output circuit, a rectifying device having an anode and a thermionic cathode whose electron emissivity varies in accordance with its operating temperature, a heater winding for said cathode and connections from said loop to said winding for varying said temperature and said emissivity proportionally to said high frequency currents, said device thereby constituting an equivalent conductance whose value varies proportionally to the amplitude of said currents, a source of operating voltage for said generator, said source comprising electron discharge devices having control electrodes adapted to receive a bias voltage from said rectifying device for regulating the magnitude of said operating voltage.

4. A regulatory system for limiting the oscillatory currents in the tuned output circuit of an oscillator operating as a high frequency heater, comprising a pair of coupling loops located in proximity to said output circuit and in the magnetic field produced by said oscillatory currents, a diode rectifier having an anode and a filament whose electron emissivity varies in accordance with the current therethrough, one of said loops being connected to said filament, and the other of said loops being connected, in series with the anode-filament circuit of said rectifier, to a network for developing therein a unidirectional signal whose magnitude varies with the amplitude of said currents, both said loops cooperating to increase the effective variation in the magnitude of said signal with respect to variations in the amplitude of said currents, a source of unidirectional operating voltage for said oscillator, said source comprising a rectifier tube having an electrode for controlling the magnitude of said unidirectional operating voltage, and connections from said network for applying said signal to said electrode.

OLIVER F. GULLICK.

REFERENCES CITED

The following references are of record in the file of this patent:

UNITED STATES PATENTS

| Number | Name | Date |
|---|---|---|
| 2,175,694 | Jones | Oct. 10, 1939 |
| 2,431,902 | Albin | Dec. 2, 1947 |

FOREIGN PATENTS

| Number | Country | Date |
|---|---|---|
| 439,166 | Great Britain | Dec. 2, 1935 |